United States Patent [11] 3,582,693

[72] Inventor Louis Richard O'Hare
 2700 Indiana, N.E., Albuquerque, N. Mex. 87110
[21] Appl. No. 766,447
[22] Filed Oct. 10, 1968
[45] Patented June 1, 1971

[54] CONDUCTIVE FLAME VARIABLE CAPACITY GENERATOR
 3 Claims, 1 Drawing Fig.
[52] U.S. Cl. ............ 310/10
[51] Int. Cl. ............ H02m 3/00
[50] Field of Search ............ 310/5, 6, 10, 11; 103/1; 60/202

[56] References Cited
UNITED STATES PATENTS
2,208,217  7/1940  Landerholm ............ 310/5
3,206,625  9/1965  Stuetzer ............ 310/6

Primary Examiner—D. X. Sliney

ABSTRACT: In the conductive flame variable capacity generator, the electrostatic capacity existing between two spheres of opposite charge is changed by a pulsed electrically conductive gas. Current flow resultant in the conductive gas which the pulse of gas is effecting, is coupled by means of a type of capacitor inside one of the spheres to a transformer attached to the sphere. Each pulse of gas increases and decreases the capacity as it respectively moves in and then through the space between the spheres and each corresponding surge of current is brought out through the transformer in electrical series with this action.

PATENTED JUN 1 1971
3,582,693
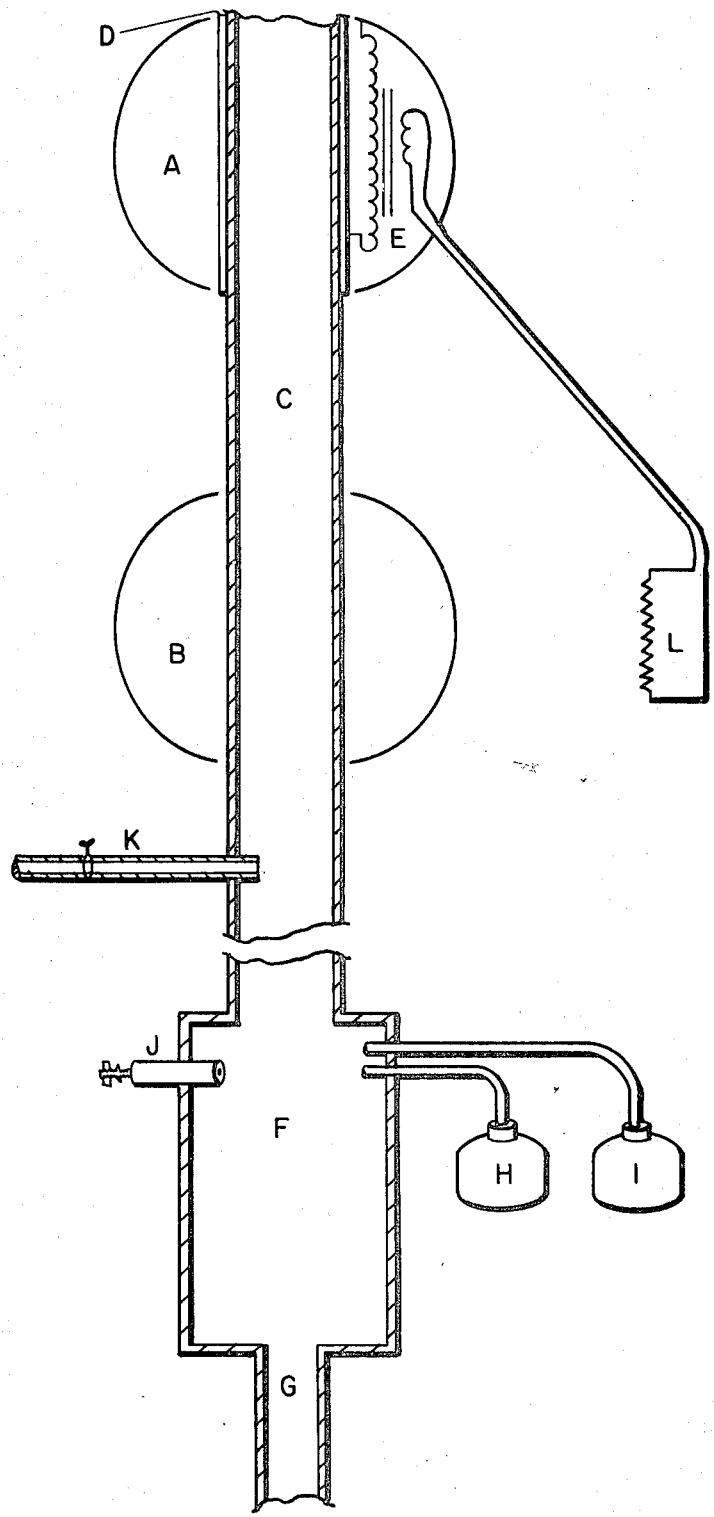
INVENTOR.
BY Louis Richard O'Hare

3,582,693

CONDUCTIVE FLAME VARIABLE CAPACITY GENERATOR

My invention employs the use of heat energy derived from a burning fuel, together with the conductive electric properties of a hot or combusting gas, to produce a rapid series of electric-capacity changes between two spheres of very high voltage charge, each of these spheres having voltage of opposite sign. A series of pulses of hot conductive gas moves through a ceramic tube. This tube, while containing each one of the pulses of hot conductive gas, acts to capacity-couple the two spheres of opposite charge through which it passes. Each pulse of hot electrically conductive gas is alternatively followed by a flow of nonconductive air. The effect of pulsing this gas is to produce a constantly changing capacitance of a very high voltage type of electrical condenser. This invention employs very few moving parts, or no moving parts, and since electrostatic type fields can exert the strongest forces per given area, then working against these forces can produce relatively small and powerful generators. Finally, a variable capacitor may be made to pump electricity. But it has been difficult to find a simple method of employing heat energy to change the capacitance of a condenser. One such method tried in the past was to place barium-titanate between the plates of a condenser. The dipole activity and dielectric constant would change radically as its temperature was raised or lowered through the curie point.

The barium-titanate condenser was thus a variable condenser. When a fixed condenser, a transformer, and a variable condenser are placed in series, and an electric charge is placed on the fixed condenser, a change of the capacity of the variable condenser can cause the current to flow through the transfer winding in the series. In the case where the variable condenser has a dielectric of barium titanate, heat could be made to cause the change in capacitance and the consequent current flow. But while this is a practical method, it has some disadvantages, in that dielectric strengths are low, voltages must be kept low. Intense fields cannot be employed. Heat transfer is slow. Condenser capacity change is therefore slow and electric pumping action is slow. My method employs a way of rapidly changing capacity while using very high voltages and intense fields. My method rapidly and repeatedly changes the capacity between two spheres of opposite electrical sign and very high voltage by making a long column inside of the ceramic tube extending through these spheres alternately conductive and then nonconductive. As the electrostatic field which initially extends radially outward from the two spheres is made to extend from one sphere toward the other by placing of a conductor between them (the conductor is the conductive hot gas), current will flow in the conductor by means of induction, just as current will flow in the rotor of a butterfly variable condenser as it rotates to inductively align the field of two opposite sets of stator plates. An electric transformer is placed inductively in series with this current-flow-producing-effect, and working-power current is taken from the secondary winding of this transformer. The transformer is highly insulated with respect to its own windings, as well as with respect to primary insulation from secondary windings and lead and power wires. The drawing shows a schematic of the variable capacitor generator.

In the drawing,

"A" is a large metallic sphere at least 2 feet in diameter. It has a several hundred kv. positive charge on it provided by Van de Graff Gen., or similar source.

"B" is a similar sphere with a negative charge of similar amplitude.

"C" is a ceramic tube of high dielectric strength insulating qualities and of material that will sustain considerable heat and temperature. The length of this tube is such as to form part of a resonant combustion system, together with Combustion Chamber "F" and Intake Port "G."

"D" is a metallic cylinder encircling Ceramic Tube "C."

"E" is very high turns ratio transformer as a powerful x-ray type transformer, in which the high voltage side 500—600 kv., and the secondary is 110volts. This transformer is oil or alcohol emersed with good physical separation between magnetic core and primary and secondary windings.

"F" is the combustion chamber made of material such as stainless steel, with good temperature and tensile strength qualities. It is cylindrical in shape, and size tuned to resonate.

"G" is the air intake post. This may be one-fourth the length of "C" and about one-fifth to one-tenth the diameter of "F." This may be valved as in a pulse-jet or merely adjusted for size in a resonant heater.

"H" is vaporized hydrocarbon or other fuel. "I" is a solution of potassium nitrate or other salt, which helps to render combustion flame more electrically conductive.

"J" is the ignitor used to begin the pulsating ignition process, which is self-sustaining after ignition.

"K" is air inlet port, adjustable to allow a small amount of air to follow the hot area of compressed gas as it moves upward through tube "C."

"L" is the load, representing any electrical device which requires electrical power of the output voltage and frequency.

When ignitor "J" is attached to an appropriate source of electric current, and fuel is admitted from source "H," combustion can occur in chamber "F," especially if added with auxiliary compressed air at input port "G." Compression pressure balls of burning gases, which are made electrically conductive by salt solution applied from source "I," rise rapidly through tube "C." The electrically conductive quality of these gases in the tube capacity couples opposite charges on spheres "B" and "A," but this capacity coupling is made through transformer "E" and cylinder "D," which cylinder encircles ceramic tube "C." This cylinder "D" is securely insulated from sphere "A." Since capacity coupling of charge "A" to charge "B" through conductor flame in "C" moves much of charge on surface of "A" to cylinder "D" there is a current flow through transformer "E." Then when the flame compression wave passes on through the tube and cool air enters through "K," at this point capacity coupling to a great extent ceases, and the "like-charge-repelling forces" on cylinder "D" cause this charge to move back through transformer "E" to surface of "A." This cycle recurs continually as the pulse jet effect continues, and the rising balls of pressure create a vacuum behind them which bring in nonconductive air through "K," and air for the next combustion cycle through "G."

I claim:

1. A generator of electricity which comprises two large spherical elements for storing high voltages of opposite sign, which elements, being charged to potential by any power supply capable of 100 kv. output or more, have a ceramic cylinder extending through both storage elements such that when a conductive flame or gas is inserted into the cylinder this same conductive gas by reason of the movement of the ions of opposite electrical sign within the gas toward the sphere elements which attract them, will act as an electrically conductive element which will capacitively couple the two charge-holding elements, which coupling action by means of a sleeve around the ceramic tube inside either or both charge holding elements and a transformer of at least 100 kv. primary inside the same element and connected to the element on one end of its primary winding and to the sleeve on the other end of its primary winding with the effect that this same above-mentioned sleeve acts as one plate of an electrical capacitor and couples the charge on the surrounding spherical element through the transformer to he conductive gas in the ceramic cylinder and through the conductive gas to the other storage element of opposite electrical sign and this coupling action will cause a current to flow momentarily in all elements engaged in the coupling action or in electrical series with this action as the gas is inserted into the tube and other current to flow as the conductive gas leaves the cylinder and electrostatic forces of surrounding sphere forcelike charge off of sleeve through transformer and onto the outside of same surrounding sphere which movement of a charge first on one direction then in another through the transformer is made to induce useful power in the secondary of the transformer.

2. A generator of electricity which comprises two large spherical elements for storing high voltages of opposite sign which elements being charged to potential by any power supply capable of 100 kv. output or more have a ceramic cylinder extending through both storage elements such that when a conductive flame or gas is inserted into the cylinder by the use of heat energy which produces pressure in a pressure chamber and gas movement through the opening in the chamber, this same conductive gas by reason of the movement of the ions of opposite electrical sign within the gas toward the sphere elements which attract them will act as an electrically conductive element which will capacitively couple or increase the electrical capacity between the two charge-holding elements, which coupling action by means of a sleeve around the ceramic tube inside either or both charge holding elements and transformer of at least 100 kv. primary inside the same element and connected to the element on one end of its primary winding and to the sleeve on the other end of its primary winding with the effect that this same above-mentioned sleeve as one plate of an electrical capacitor and by means of the capacity between it and the gas inside the tube couples the charge on the surrounding spherical element through the transformer to the conductive gas in the cylinder and through the conductive gas to the other storage element of opposite electrical sign by means electrical capacity between the element and the gas and this total coupling action will cause a current to flow momentarily in all elements engaged in the coupling action or in electrical series with this coupling action as the gas is inserted into the tube and another current to flow as the same gas propelled by heat energy from the pressure chamber, leaves the cylinder by its own momentum and the electrostatic forces of the sphere surrounding the sleeve force the like charges off of the sleeve through the transformer and back onto the outside of the same surrounding sphere which movement of a charge first in one direction then in another direction through the transformer causes the induction of useful power in the secondary of the transformer.

3. A generator of electricity which comprises tow large spherical elements for storing high voltage of opposite sign, which elements being charged to potential by any power supply capable of 100 kv. output or more, have a ceramic cylinder extending through both storage elements such that when a conductive flame or gas is inserted into the cylinder by a resonant combustion chamber of the pulse jet type, then this same conductive gas by reason of the movement of the ions of opposite electrical sign within the gas toward the sphere elements which attract them will act as an electrically conductive element which will capacitively couple the two charge holding elements, which coupling action by means of a sleeve around the ceramic tube inside either or both charge holding elements and a transformer of at least 100 kv. primary inside the same element and connected to the element on one end of its primary winding and to the sleeve on the other end of its primary winding with the effect that this same above-mentioned sleeve acts as one plate of an electrical condenser and couples the charge on the surrounding spherical element through a transformer to the conductive gas in the ceramic cylinder, which at that point acts like the other plate of the electrical condenser and the coupling continues through the conductive gas to the other storage element of opposite electrical sign, which coupling action will cause a current to flow momentarily in all elements engaged in the coupling action or in electrical series with this action as the gas is inserted into the tube and another current to flow as the conductive gas leaves the cylinder and electrostatic forces of the surrounding sphere forcelike charges off of the sleeve through the transformer and onto the outside of the same surrounding sphere which movement of a charge first in one direction then in the other through the transformer is made to induce useful power in the secondary.